Patented June 14, 1927.

1,632,579

UNITED STATES PATENT OFFICE.

WILLIAM R. BARGER AND LON A. HAWKINS, OF WASHINGTON, DISTRICT OF COLUMBIA, AND CLARENCE P. BLATZ, OF PASADENA, CALIFORNIA, ASSIGNORS, BY MESNE ASSIGNMENTS, TO THE PEOPLE OF THE UNITED STATES.

PROCESS FOR TREATMENT OF FRUIT IN THE PREPARATION OF FRUIT FOR MARKET.

No Drawing. Application filed January 25, 1926. Serial No. 83,706.

(GRANTED UNDER THE ACT OF MARCH 3, 1883; 22 STAT. L. 625.)

This application is made under the act of March 3, 1883, Chapter 143 (22 Stat. 625), and the invention herein described and claimed may be used by the Government of the United States or any of its officers or employees in the prosecution of work for the Government, or any person in the United States without payment to us for any royalty thereon.

The invention consists of a process for cooling fruit in preparation for transportation to market or storage by passing it through a tank filled with water or a solution such as an antiseptic solution, which is cooled by melting ice or by mechanical refrigeration. The process is applicable especially to lemons which are washed in hot water then are cooled to temperatures of 55 to 60° for storage, of oranges which after being washed in hot water are usually loaded in ice cars and cooled to 45 to 55° F. en route to market. It has been found that by immersing oranges or lemons in water at a temperature of 33° F. for ten minutes the skin of the fruit can be cooled from a temperature of approximately 86° F. to a temperature of approximately 58° F. a lowering of the temperature of 18° F. while the interior of the fruit cooled from about 76° F. to about 63° F. a lowering of the temperature of 13° F. in the same length of time and under the same conditions. It is a great advantage in controlling fungus diseases to cool quickly, and by using an antiseptic such as a compound of borax and boric acid in the proportion of approximately 1 part borax to 2 parts boric acid in the tank it is possible to combine the cooling with an antiseptic treatment which greatly lessens the danger of loss from decay by fungus rot. The apparatus described by Barger, Hukill and Hawkins in United States Patent No. 1,559,733, dated November 3, 1925, is adapted to this process if ice is used in cooling the liquid in the tank or if a cooling coil is placed in the tank by which the temperature of the liquid may be reduced by mechanical refrigeration.

We claim:

A process for the preparation of fruit for the market, consisting in washing the fruit in hot water, and then subjecting the fruit for a period of ten minutes to a bath of liquid such as water with an antiseptic dissolved therein, maintained at a temperature of 35° F.

WILLIAM R. BARGER.
LON A. HAWKINS.
CLARENCE P. BLATZ.